US010566776B2

(12) United States Patent
Bonilla et al.

(10) Patent No.: US 10,566,776 B2
(45) Date of Patent: Feb. 18, 2020

(54) OUTDOOR FLOOR BOX ENCLOSURE

(71) Applicant: Hubbell Incorporated, Shelton, CT (US)

(72) Inventors: Nelson Bonilla, Winter Garden, FL (US); David L. Lutz, Woodbridge, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/231,158

(22) Filed: Aug. 8, 2016

(65) Prior Publication Data

US 2017/0040789 A1     Feb. 9, 2017

Related U.S. Application Data

(60) Provisional application No. 62/201,927, filed on Aug. 6, 2015.

(51) Int. Cl.
H02G 3/08 (2006.01)
H02G 9/02 (2006.01)

(52) U.S. Cl.
CPC .................... *H02G 3/088* (2013.01)

(58) Field of Classification Search
CPC ........... H02G 3/088; H02G 3/081; H02G 9/02
USPC ..................... 174/50, 58; 379/412
See application file for complete search history.

(56) References Cited

U.S. PATENT DOCUMENTS

| 4,410,004 A | * | 10/1983 | Kifer | D06F 39/08 137/360 |
| 4,647,725 A | * | 3/1987 | Dellinger | H04Q 1/028 379/19 |
| 4,729,059 A | * | 3/1988 | Wang | H01R 13/502 361/56 |
| 4,853,960 A | * | 8/1989 | Smith | H04M 1/24 361/119 |

(Continued)

FOREIGN PATENT DOCUMENTS

| CN | 1242636 | 1/2000 |
| CN | 103999356 | 8/2014 |

OTHER PUBLICATIONS

Industrial Cord Reels 15A and 20A GFCI Protected Cord Reels. Datasheet [online] Hubbell Incorporated, Feb. 9, 2009 [retrieved on Sep. 21, 2016] Retrieved from the Internet: <URL:http://www.hubbell-wiring.com/press/pdfs/H5266.pdf>, entire document.

(Continued)

Primary Examiner — Dimary S Lopez Cruz
(74) Attorney, Agent, or Firm — Michael Best & Friedrich, LLP

(57) ABSTRACT

An outdoor enclosure provides weather protection for electrical equipment. More particularly, an outdoor enclosure having a cover flush with the floor or the ground and an interior space beneath the floor or ground is provided. The interior space is maintained in a water-tight condition when the cover of the enclosure and a door within the cover are closed and a drain is provided in the floor of the interior space to allow water to drain from the interior space if and when such water enters the enclosure. Electrical cables and a receptacle with ground fault protection are stowed within the enclosure and pulled through the door in the cover when a user needs access to electrical power via the receptacle.

18 Claims, 6 Drawing Sheets

(56) References Cited

U.S. PATENT DOCUMENTS

| | | | | |
|---|---|---|---|---|
| 4,864,078 | A * | 9/1989 | Bowman | H02G 3/185 |
| | | | | 174/486 |
| 5,342,993 | A * | 8/1994 | Siems | H02G 3/185 |
| | | | | 174/481 |
| 6,147,304 | A * | 11/2000 | Doherty | H02G 3/086 |
| | | | | 174/481 |
| 6,585,221 | B1 | 7/2003 | Gretz | |
| 6,610,927 | B2 * | 8/2003 | Dinh | H02G 3/088 |
| | | | | 174/66 |
| 7,173,194 | B2 * | 2/2007 | Rupert | H02G 3/185 |
| | | | | 174/480 |
| 7,205,488 | B2 * | 4/2007 | Riner | H02G 3/185 |
| | | | | 174/481 |
| 8,371,863 | B1 * | 2/2013 | Ganta | H02G 3/105 |
| | | | | 439/107 |
| 8,785,773 | B1 * | 7/2014 | Lanni | H02G 3/14 |
| | | | | 174/53 |
| 2005/0211455 | A1 | 9/2005 | Cole | |
| 2006/0027384 | A1 | 2/2006 | Scanzillo | |
| 2013/0078853 | A1 | 3/2013 | Dinh | |
| 2014/0144667 | A1 | 5/2014 | DeBartolo, Jr. et al. | |

OTHER PUBLICATIONS

PCT/US2016/046017 International Search Report and Written Opinion dated Oct. 14, 2016 (14 pages).

Chinese Patent Application No. CN201680056775.8, First Office Action Issued by China National Intellectual Property Administration dated Feb. 19, 2019, and translation (15 pages).

* cited by examiner

OUTDOOR FLOOR BOX ENCLOSURE

RELATED APPLICATIONS

The present application claims priority to U.S. Provisional Application No. 62/201,927, filed Aug. 6, 2015, the entire contents of which are hereby incorporated.

FIELD

This invention relates to electrical enclosures, in particular to electrical floor box enclosures intended for use outdoors or in other locations where wet conditions exist or are expected.

BACKGROUND

Floor box enclosures for housing electrical devices such as power receptacles typically have a hinged cover that can be opened for access to the enclosure interior. The enclosure is installed with the cover substantially at ground or floor level. Keeping the housed devices dry, or at least out of direct contact with water, presents a challenge when rain or surface water is present, and especially when a cable connected to a device extends out of the enclosure.

SUMMARY

An enclosure consistent with embodiments of the invention disclosed herein has a cover with a cable door, a water-tight junction box and an opening in its bottom that allows water to drain from the enclosure. At least one marine-grade, water-tight cable set is hard-wired to the line in the junction box and can be stowed in the enclosure. The cable set can be pulled out of the enclosure when needed, such as for powering lighting or other equipment for events or other functions.

According to one exemplary embodiment an outdoor enclosure for holding electrical equipment beneath the surface of a floor or the ground is provided having a housing with an interior space defined by four walls and a floor disposed at the base of the four walls, a flange surrounding a perimeter of the housing at substantially a right angle to a top of the four walls, a cover disposed within an interior perimeter of the flange at the top of the four walls, the cover being operable to expose said interior space of said housing in an open position and enclose the interior space of said housing in a closed position. The outdoor enclosure according to this exemplary embodiment further includes one or more utility electrical cables disposed within the interior space, the cables having a first end protruding through one or more of the four walls or the floor of the housing and a second end electrically connected to an electrical device.

According to a further exemplary embodiment an outdoor enclosure for holding electrical equipment beneath the surface of a floor or the ground is provided having a rectangular housing with an interior space defined by four walls and a floor having a drain hole disposed at the base of the four walls. A flange surrounding a perimeter of the housing at a top of the four walls and a cover flush with the flange and disposed within an interior perimeter of the flange at the top of the four walls is also provided. The cover is operable to expose the interior space of the housing in an open position and enclose the interior space of the housing in a closed position. According to this exemplary embodiment a water-tight junction box and one or more utility electrical cables are disposed within the interior space. The utility electrical cables have a first end disposed within the junction box and a second end electrically connected to an electrical device.

BRIEF DESCRIPTION OF THE DRAWINGS

Exemplary embodiments of the disclosed invention are described in detail below, purely by way of example, with reference to the accompanying figures, in which.

DETAILED DESCRIPTION OF EXEMPLARY EMBODIMENTS

Figure 1:
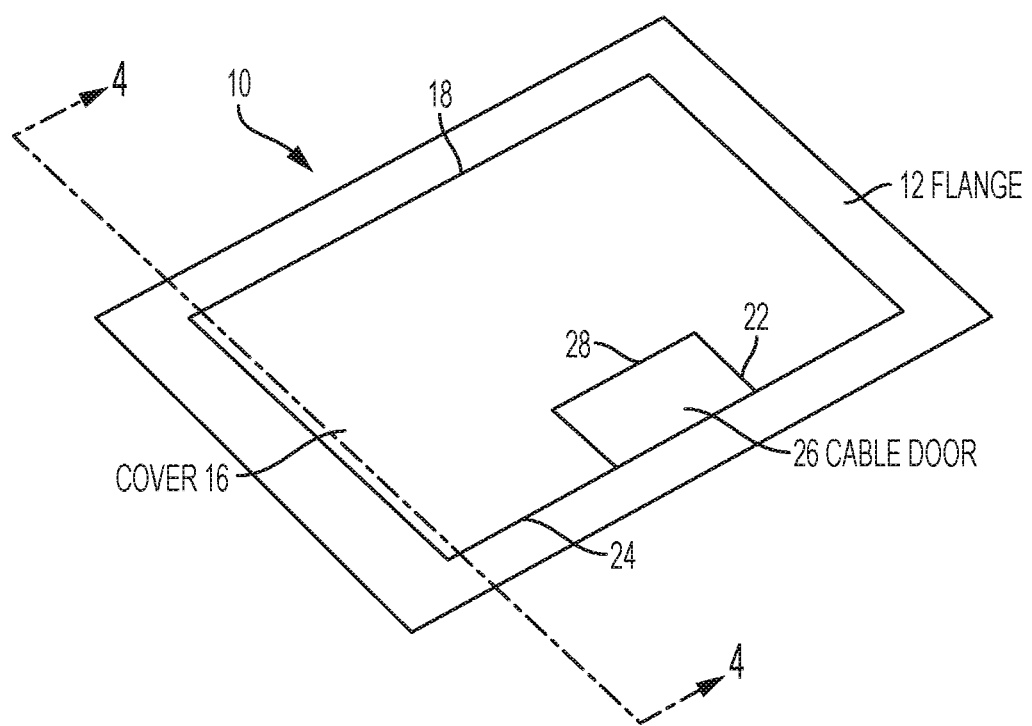
FIG. 1 is a top perspective view of a first embodiment of the enclosure of the invention, shown installed in the ground with the cover closed.

Referring to FIGS. 1-4, a floor box enclosure 10 according to a first embodiment of the invention comprises four side walls 14, a bottom wall 15 joined to the side walls, and a surrounding upper flange 12 joined to the tops of the side walls. An upwardly opening cover 16 is hinged along its rear edge 18 to the flange 12 and when closed fills the opening 20 defined by the flange (see FIG. 1). When closed, cover 16 rests flush with flange 12 on one or more flange- or wall-supported stops (not shown); for example, one or more protrusions projecting from walls 14 within the enclosure. Cover 16 has a cable opening 22 at the cover's free front edge 24 and an inwardly opening cable door 26—hinged at its inner edge 28 to cover 16—which blocks cable opening 22 when closed. Cable door 26 is maintained in its closed position flush with flange 12 by a spring or a suitable latch (not shown).

Sealing gaskets (not shown) made of rubber or other suitable material are optionally provided at the interface between cover 16 and flange 12 and/or at the interface between cable door 26 and cover 16 to make the enclosure substantially water-tight when cover 16 and cable door 26 are closed. Any liquid entering the enclosure exits, for example, by the force of gravity through a drain 30 in bottom wall 15 (see FIGS. 2 and 4). In at least one embodiment floor 15 is positioned within the enclosure at an angle to facilitate water to be directed toward drain 30.

Figure 4:
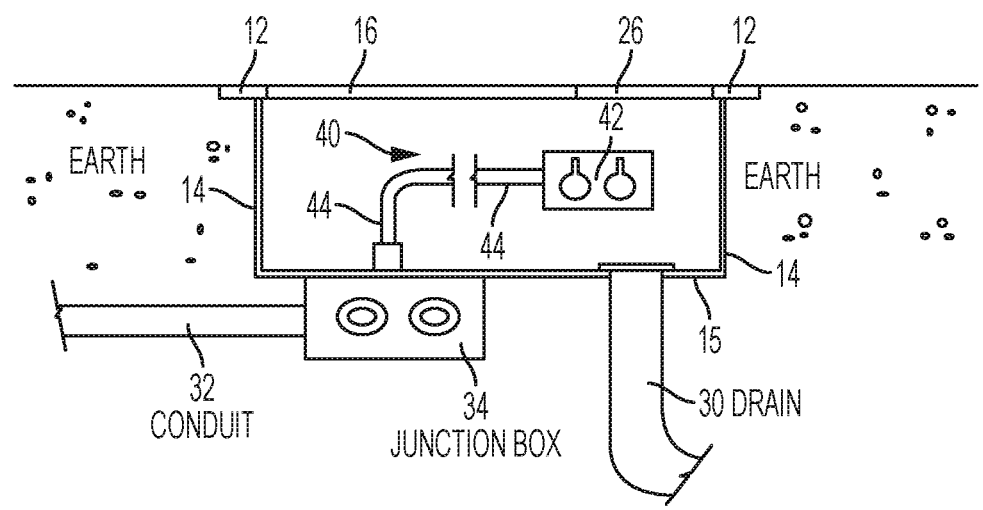
FIG. 4 is a cross-sectional view thereof taken along line 4-4 in FIG. 1.
Figure 5:
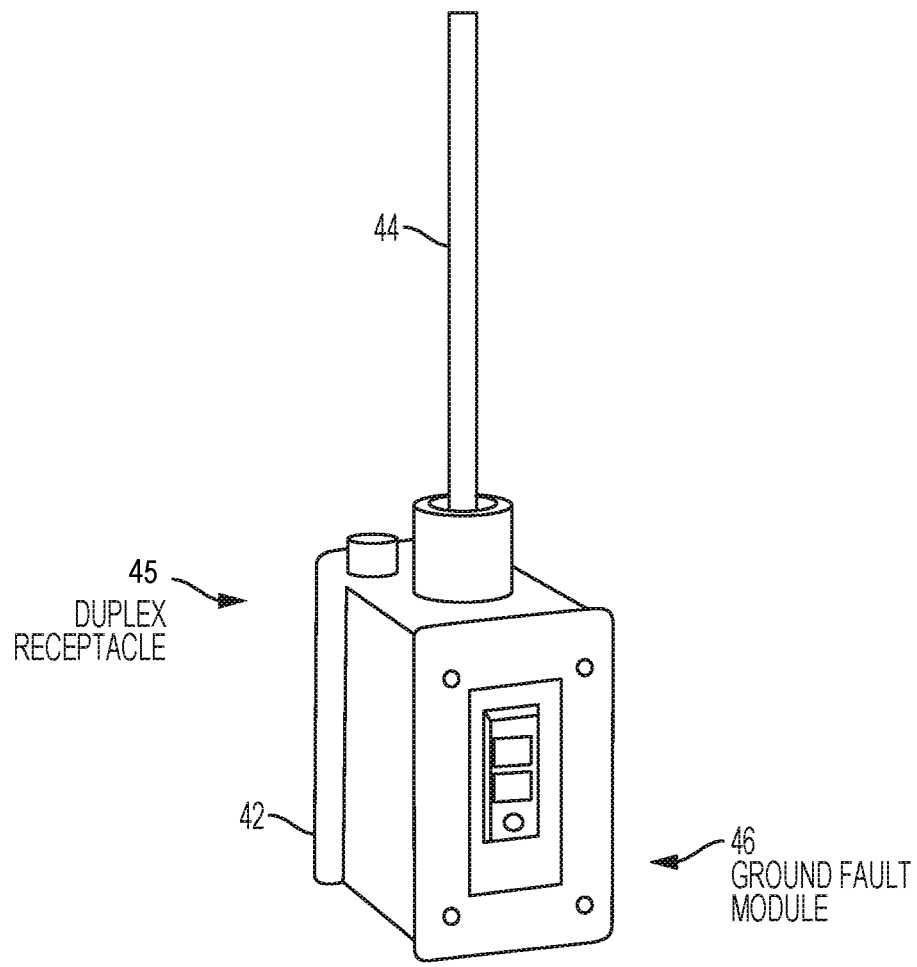
FIG. 5 is a perspective view of an exemplary device at the end of the cable set.

Electrical power is fed to the enclosure from beneath via, for example, a non-metallic conduit 32 joined to a water-tight junction box 34, which is mounted to the underside of bottom wall 15 (see FIG. 4). Alternatively, junction box 34 could be mounted within the enclosure and conduit 32 can be joined to walls 14 or floor 15 using a water-tight connection. A marine-grade, water-tight cable set 40 comprises a device 42 at one end of a cable 44, which is hard-wired to the line within junction box 34. Illustrated device 42 has a duplex receptacle 45 on one side protected by a ground fault module 46 on the other side (see FIG. 5) and is shown mating with a three-prong plug 48 (see FIG. 3).

Figure 2:
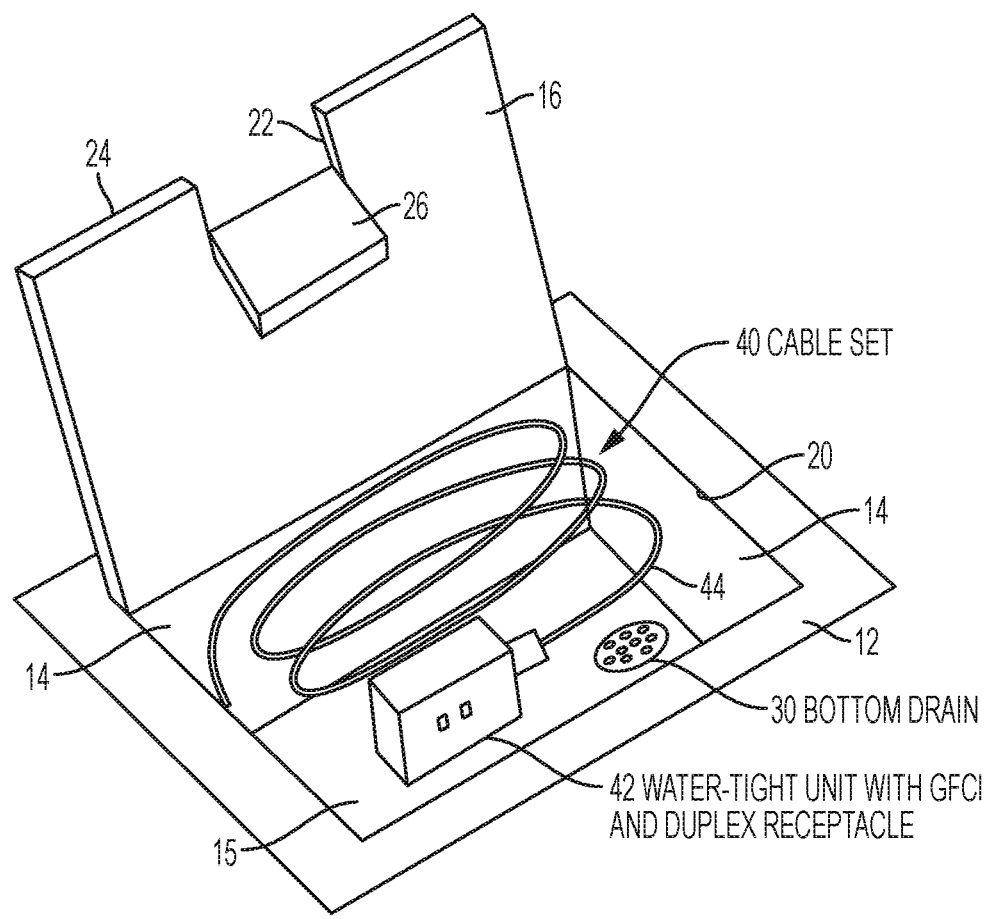
FIG. 2 is a top perspective view thereof shown with the cover open and the cable set stowed therein.
Figure 3:
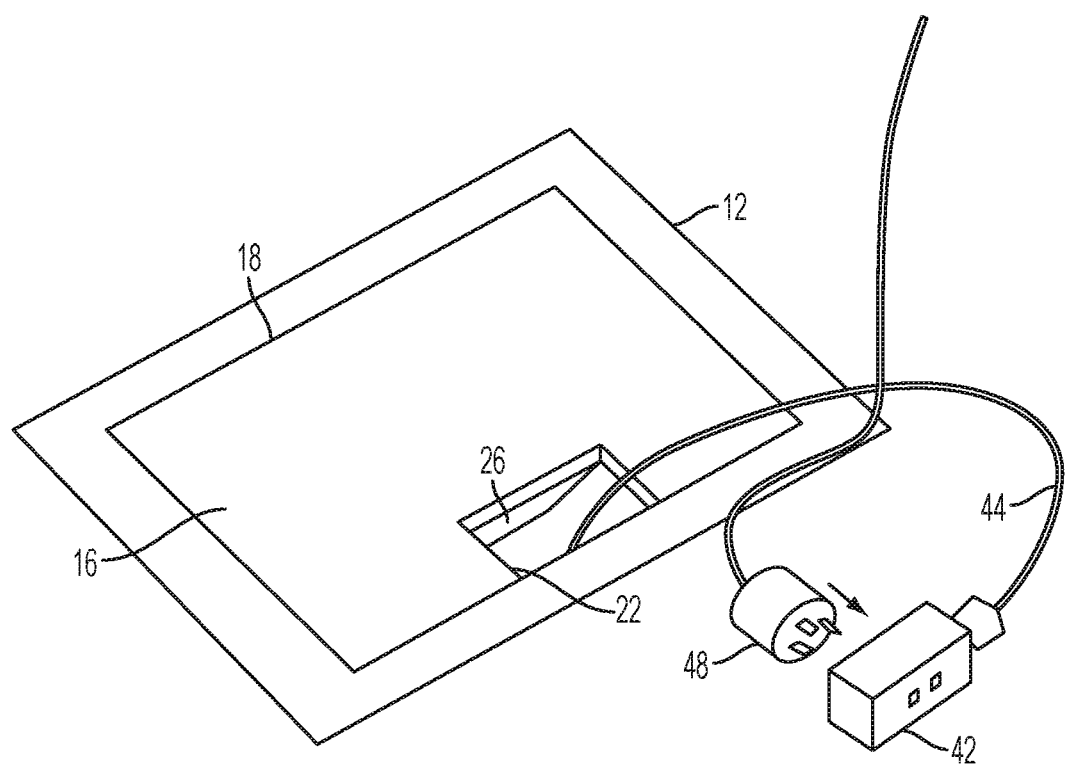
FIG. 3 is a top perspective view thereof shown with the cover closed and the cable set extending outward through the cable door opening.

When not in use, cable set 40 may be coiled up and stowed in the enclosure (see FIG. 2). When the cable set is to be used, cover 16 is raised, cable door 26 is opened and the cable set is pulled out of the enclosure. Cover 16 may then be closed, leaving cable 16 protruding through cable opening 22 (see FIG. 3). The Figures show only one cable set; however, a plurality of cable sets may be provided, all of which would be hard-wired to the line within junction box 34. In that case, the enclosure would be sized to stow all of the cable sets together.

Figure 6:
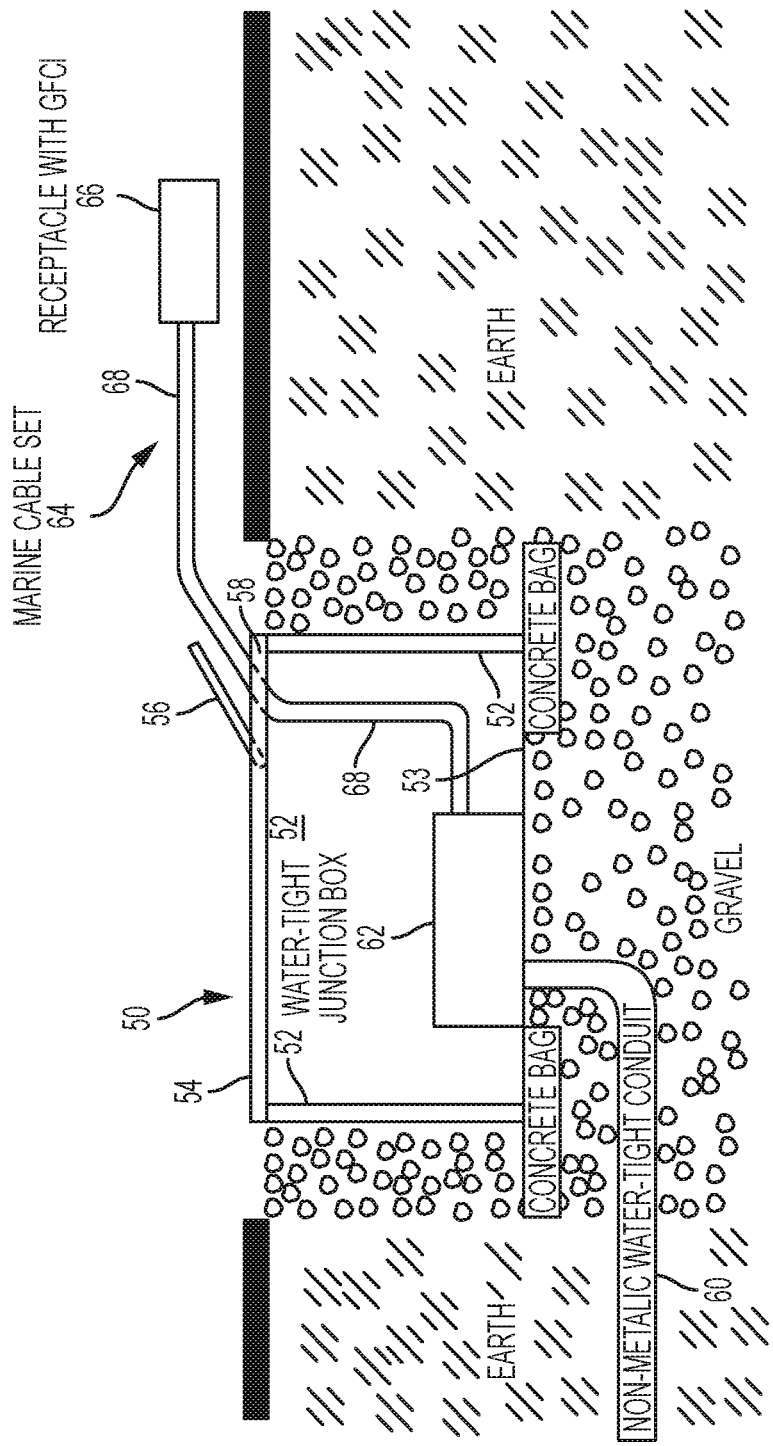
FIG. 6 is a cross-sectional view of a second embodiment of the enclosure of the invention and showing the cable set extended for use.

Referring to FIG. 6, a floor box enclosure 50 according to a second embodiment of the invention has an open bottom through which liquid can drain into a gravel bed that supports and surrounds the enclosure. The enclosure comprises four side walls 52 defining a bottom opening 53, a cover 54 with a cable opening 58, and a cable door 56 hinged to the cover to open upwardly and to block the cable opening when flush with the cover. The enclosure preferably rests on concrete bags, which provide a more stable footing than the gravel bed alone. Suitable sealing gaskets (not shown) may be provided at the joints between cover 54 and side walls 52, and between cable door 56 and cover 54.

A non-metallic, water-tight conduit 60 feeds power to a water-tight junction box 62, which rests on the gravel bed within the enclosure. A marine-grade, water-tight cable set 64 comprises a device 66 at one end of a cable 68, which is hard-wired to the line within junction box 62. The illustrated device 66 is a GFCI-protected receptacle, such as that shown in FIG. 5. As in the first embodiment, a plurality of cable sets may be provided, all of which would be hard-wired to the line within junction box 62 and may be coiled up and stowed in the enclosure when not in use.

In the illustrated embodiments, the cable set terminates in a GFCI-protected duplex receptacle. This is but one example of devices that may terminate a cable set. Another example is a sleeve-type connector (socket), preferably with a water-tight flip cover, which would mate with a pin-type plug. Yet another example is a portable outlet box with either straight-blade or twist-lock devices, and protective lid covers that would power multiple end-use applications.

An alternative junction box within the enclosure could be fully sealed and waterproof and have a removable waterproof fitting that allows access to a power connector. Such a junction box could be made significantly more waterproof than standard marine or rainproof connectors. An accessory cord set could then be attached to this connector to extend power outside the enclosure to other power distribution or utilization equipment. This allows the use of standard marine or rain-proof connectors and cords for power needs, and when not in use the main connection can be made waterproof and left underground when not in use. This sealed internal box could also be on the end of a flexible waterproof cable so that it can be pulled out of the enclosure for easier access. The sealed box could be used to feed to a spider box, which would then provide power for the various end-use applications.

Additional, optional features for enclosures according to the invention could include an internal sensor linked to an external indicator to show submersion, an auto-disconnect device and/or various safety indicators.

Floor box enclosures according to the invention preferably are made of materials suitable for in-ground and likely wet conditions. A preferred material is polymer concrete, which is made from selectively graded aggregates in combination with a polymer resin system. When combined through a process of mixing, molding and curing, a powerful cross-linked bond is formed. Precast polymer concrete may be reinforced with fiberglass for enhanced strength and rigidity. Commercial examples of products made of polymer concrete are underground enclosures sold by Hubbell Power Systems, Inc. under the QUAZITE brand name.

While exemplary embodiments have been chosen to illustrate the invention, it will be understood by those skilled in the art that various changes, modifications, additions, and substitutions are possible, without departing from the scope and spirit of the invention.

What is claimed is:

1. An outdoor enclosure for holding electrical equipment beneath the surface of a floor or the ground, the outdoor enclosure comprising:
    a housing having an interior space defined by a plurality of walls;
    a cover coupled to the housing and disposed adjacent an upper edge of the walls, said cover being operable to expose said interior space of said housing in an open position and enclose said interior space of said housing in a closed position;
    one or more utility electrical cables disposed within said interior space, at least one cable of the one or more utility electrical cables having a first end and a second end, the first end configured to receive electrical current from a power source; and
    an electrical device in electrical communication with the second end of the cable, the electrical device being covered by the cover while the electrical device is stored in the interior space and the cover is in the closed position, the electrical device being removable from said interior space of the housing while connected to the one cable of the one or more utility electrical cables,
    wherein, in a stowed position, said one or more utility electrical cables and electrical device are disposed within said interior space, and in an extended position, at least a portion of the one or more utility electrical cables may protrude through an opening in the cover such that the electrical device is operably connected to the one or more electrical cables while positioned at a location exterior to the enclosure.

2. The outdoor enclosure recited in claim 1 wherein said cover comprises a cable door through which said one or more utility electrical cables and said electrical device can be pulled through when said cable door is in an open position and the cover is in a closed position, and wherein further said cable door provides a water-tight seal when in a closed position.

3. The outdoor enclosure recited in claim 1 wherein said electrical device includes a duplex receptacle and a ground fault module that protects the duplex receptacle.

4. The outdoor enclosure recited in claim 3 wherein said electrical device is a watertight device.

5. The outdoor enclosure recited in claim 1 wherein a top surface of said cover is flush with a top surface of a flange when said cover is in the closed position, the flange extending along at least a portion of an upper edge of the walls of the housing.

6. The outdoor enclosure recited in claim 5, wherein said flange and said cover are flush with the surface of the ground.

7. The outdoor enclosure recited in claim 5, wherein said flange and said cover are flush with the surface of the floor.

8. The outdoor enclosure recited in claim 1 further comprising a drain hole disposed in a bottom wall of said housing.

9. The outdoor enclosure recited in claim 8 further comprising:
    a junction box attached to an underside of said bottom wall of said housing;

a conduit attached to said junction box and carrying mains electrical cables, wherein said mains electrical cables and said utility electrical cables are electrically connected within said junction box.

10. The outdoor enclosure recited in claim 9 further comprising:
   a drain pipe attached to said drain hole carrying said any liquid from within said interior enclosure away from said housing.

11. The outdoor enclosure recited in claim 10, wherein said one or more utility cables and said electrical device are stowed within said interior enclosure of said housing and pulled through a cable door to provide power to a user.

12. An outdoor enclosure for holding electrical equipment beneath the surface of a floor or the ground, the outdoor enclosure comprising:
   a housing having an interior space defined by a plurality of walls;
   a cover disposed adjacent an upper edge of the walls, said cover being operable to expose said interior space of said housing in an open position and enclose said interior space of said housing in a closed position;
   a water-tight junction box disposed within said interior space; and
   one or more utility electrical cables disposed within said interior space, at least one cable of the one or more utility electrical cables having a first end and a second end, the first end configured to receive electrical current from said junction box and the second end electrically connected to an electrical device, the electrical device configured to receive electrical current from the junction box and being removable from said interior space of the housing while remaining connected to the one cable of the one or more utility electrical cables.

13. The outdoor enclosure recited in claim 12, wherein said cover includes a door through which said electrical device and at least a portion of said utility electrical cables are pulled to provide access to said electrical device.

14. The outdoor enclosure recited in claim 13, wherein said electrical device includes an electrical receptacle.

15. The outdoor enclosure recited in claim 14, wherein a bottom wall of said housing is shaped to direct liquid towards a drain hole.

16. The outdoor enclosure recited in claim 12, wherein in a stowed position, said one or more utility electrical cables and electrical device are disposed within said interior space, and in an extended position, at least a portion of the one or more utility electrical cables may protrude through an opening in the cover such that the electrical device is operably connected to the one or more electrical cables while positioned at a location exterior to the enclosure.

17. The outdoor enclosure recited in claim 12, further comprising a flange extending along at least a portion of a perimeter of the housing adjacent the upper edge of the walls, wherein the cover is flush with the flange and positioned within an interior edge of the flange.

18. An outdoor enclosure for holding electrical equipment beneath the surface of a floor or the ground, the outdoor enclosure comprising:
   a housing having an interior space defined by a plurality of walls;
   a cover coupled to the housing and disposed adjacent an upper edge of the walls, said cover being operable to expose said interior space of said housing in an open position and enclose said interior space of said housing in a closed position;
   one or more utility electrical cables disposed within said interior space, at least one cable of the one or more utility electrical cables having a first end and a second end, the first end configured to receive electrical current from a power source;
   an electrical device in electrical communication with the second end of the cable, the electrical device being covered by the cover while the electrical device is stored in the interior space and the cover is in the closed position, the electrical device being removable from said interior space of the housing while connected to the one cable of the one or more utility electrical cables,
   a junction box attached to an underside of said bottom wall of said housing; and
   a conduit attached to said junction box and carrying mains electrical cables, wherein said mains electrical cables and said utility electrical cables are electrically connected within said junction box.

* * * * *